(12) United States Patent
Yu et al.

(10) Patent No.: US 11,331,687 B2
(45) Date of Patent: May 17, 2022

(54) MULTIPURPOSE SHOWER HEAD FIXING DEVICE AND SHOWER FIXING DEVICE

(71) Applicant: Qin Yu, Fujian (CN)

(72) Inventors: Qin Yu, Fujian (CN); Jing Guo, Hubei (CN)

(73) Assignee: Qin Yu, Fujian (CN)

( * ) Notice: Subject to any disclaimer, the term of this patent is extended or adjusted under 35 U.S.C. 154(b) by 349 days.

(21) Appl. No.: 16/661,970

(22) Filed: Oct. 23, 2019

(65) Prior Publication Data

US 2021/0023579 A1 Jan. 28, 2021

(30) Foreign Application Priority Data

Jul. 26, 2019 (CN) .......................... 201910682886.5

(51) Int. Cl.
| | | |
|---|---|---|
| *B05B 15/62* | (2018.01) | |
| *F16K 11/00* | (2006.01) | |
| *E03C 1/06* | (2006.01) | |
| *E03C 1/04* | (2006.01) | |

(52) U.S. Cl.
CPC .............. *B05B 15/62* (2018.02); *F16K 11/00* (2013.01); *E03C 1/0408* (2013.01); *E03C 1/06* (2013.01)

(58) Field of Classification Search
CPC ...................................................... B05B 15/62
USPC ...................................................... 4/601, 596
See application file for complete search history.

(56) References Cited

U.S. PATENT DOCUMENTS

| | | | | |
|---|---|---|---|---|
| 6,567,998 B2 * | 5/2003 | D'Ugo | .................. | E03C 1/06 4/569 |
| 6,643,862 B2 * | 11/2003 | Aitken | .................. | E03C 1/0408 4/601 |
| 6,775,865 B1 * | 8/2004 | Lin | .................. | B05B 1/18 4/615 |
| 7,458,112 B1 * | 12/2008 | Yang | .................. | E03C 1/0408 137/625.47 |
| 7,857,241 B2 * | 12/2010 | Deng | .................. | E03C 1/0408 239/444 |
| 8,066,204 B2 * | 11/2011 | Petrovic | .................. | B05B 1/1609 239/447 |
| 8,191,185 B2 * | 6/2012 | Tsai | .................. | E03C 1/06 4/601 |
| 8,893,320 B2 * | 11/2014 | Klicpera | .................. | B05B 12/004 4/615 |
| 8,919,709 B2 * | 12/2014 | Zhou | .................. | E03C 1/066 248/122.1 |
| 2006/0272086 A1 * | 12/2006 | Mesa | .................. | E03C 1/06 4/601 |
| 2009/0276953 A1 * | 11/2009 | Hsu | .................. | F16K 11/0445 4/601 |
| 2013/0239317 A1 * | 9/2013 | Saunders | .................. | E03C 1/0408 4/601 |
| 2015/0090811 A1 * | 4/2015 | Wu | .................. | B05B 1/18 239/446 |

(Continued)

*Primary Examiner* — Lori L Baker
(74) *Attorney, Agent, or Firm* — JCIP Global Inc.

(57) ABSTRACT

A shower fixing device includes a switching valve and a shower head fixing device. The shower head fixing device includes a connecting and fixing piece having a wrench structure and a shower head connecting mechanism detachably coupled to a shower head. The shower head connecting mechanism is fixedly connected to the connecting and fixing piece, and the connecting and fixing piece is detachably coupled to a locking nut of the switching valve.

13 Claims, 9 Drawing Sheets

(56) References Cited

U.S. PATENT DOCUMENTS

2015/0265105 A1* 9/2015 Zhou .................... B05B 1/18
                                                          137/597
2019/0274485 A1* 9/2019 Tsibulevskiy .......... A45D 42/24

* cited by examiner

MULTIPURPOSE SHOWER HEAD FIXING DEVICE AND SHOWER FIXING DEVICE

CROSS-REFERENCE TO RELATED APPLICATION

This application claims the priority benefit of China application serial no. 201910682886.5, filed on Jul. 26, 2019. The entirety of the above-mentioned patent application is hereby incorporated by reference herein and made a part of this specification.

BACKGROUND

Technical Field

The invention relates to the technical field of shower equipment, and in particular to a multipurpose shower head fixing device and a shower fixing device using the shower head fixing device.

Description of Related Art

Figure 12:
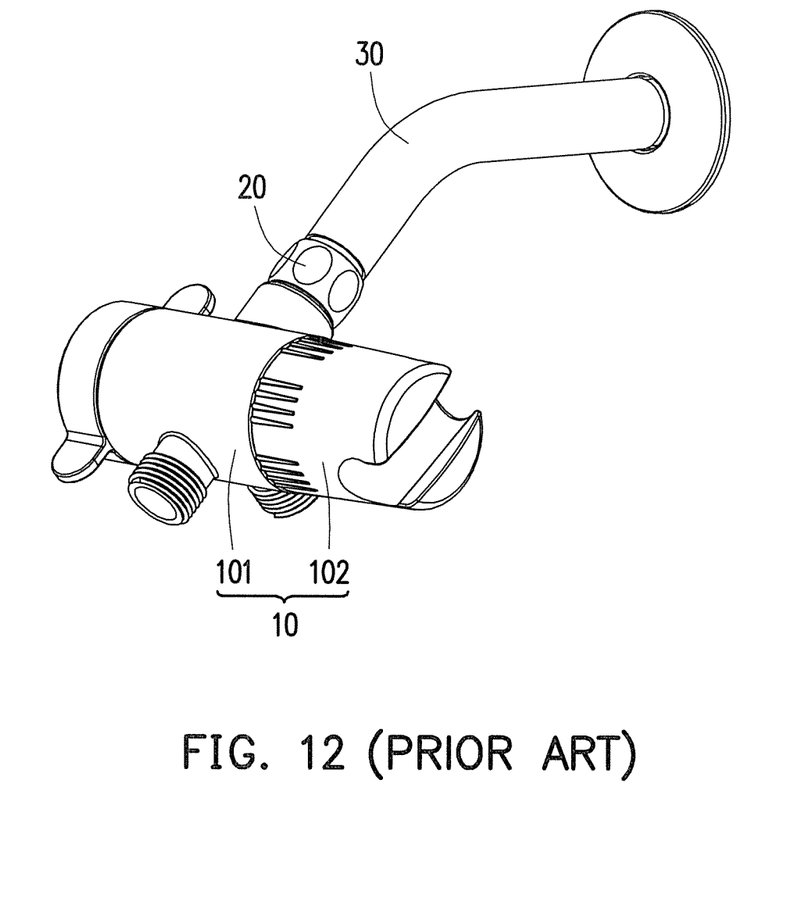
FIG. 12 is a schematic view showing a use state of a conventional integral three-way switching valve.

As shown in FIG. 12, a conventional three-way valve 10 includes a switching valve 101 and a shower head holder 102 integrally mounted on the three-way switching valve 101, and the switching valve 101 is locked on a water inlet elbow 30 via a hexagonal nut 20. When the three-way valve 10 having the integral structure is mounted, the hexagonal nut 20 needs to be screwed by virtue of a wrench, so that the three-way valve 10 is prevented from loosening. In addition, a structure, by which the shower head holder 102 is directly matched with the switching valve 101 may cause a center of the three-way valve 10 to shift, and the three-way valve 10 is prone to loosening during use, so that the wrench is required for screwing again.

The conventional three-way valve 10 needs to be mounted with a wrench acting as a mounting tool. However, the wrench is restricted in operation due to its large size, and the three-way valve 10 is prone to loosening during use due to its shift of center, leading to repeated use of the wrench for screwing and extreme inconvenience in operation.

SUMMARY

The invention aims to overcome the defects of the prior art and provides a multipurpose shower head fixing device and a multipurpose shower fixing device which are free of tools and convenient to disassemble and assemble.

To achieve the above object, the solution of the present invention is as follows.

A multipurpose shower fixing device, including a switching valve and a shower head fixing device, wherein the shower head fixing device includes a connecting and fixing piece having a wrench structure and a shower head connecting mechanism detachably matched with the shower head, the shower head connecting mechanism is fixedly connected with the connecting and fixing piece, and the connecting and fixing piece of the shower head fixing device is detachably matched with a locking nut of the switching valve.

The following solution can also be adopted for the invention.

A multipurpose shower head fixing device, including a connecting and fixing piece having a wrench structure and a shower head connecting mechanism, wherein the shower head connecting mechanism is detachably matched with a shower head, and the shower head connecting mechanism is fixedly connected with the connecting and fixing piece.

Further, the connecting and fixing piece is detachably matched with the switching valve.

Further, the shower head connecting mechanism is a shower head holder, and a slot into which the shower head is inserted is formed in one end of the shower head holder.

Further, the connecting and fixing piece is provided with a mounting hole penetrating through a left side and a right side, and the mounting hole is internally provided with at least one limiting corner which forms the wrench structure of the connecting and fixing piece.

Further, an inner peripheral wall of the mounting hole forms an inner polygon structure, and each side of an inner polygon is one limiting corner.

Further, the connecting and fixing piece is detachably and fixedly matched with the shower head connecting mechanism.

Further, a bushing is fixedly matched in the mounting hole of the connecting and fixing piece, and the limiting corners are provided on an inner peripheral wall of the bushing.

Further, a flange is formed on an inner peripheral wall of the connecting and fixing piece, a clamping flange matched with the flange is provided on an outer peripheral wall of the bushing, and the bushing and the mounting hole are also provided with convex strips and recesses which are matched mutually.

Further, the bushing is provided with at least one opening.

Further, the shower head connecting mechanism is provided with a lock hole penetrating through front and back, a lock column is provided at a front end of the connecting and fixing piece, a screw insert is fixed in the lock column, and one end of the screw is inserted into the screw insert from the lock hole of the shower head holder to fixedly connect the shower head holder and the connecting and fixing piece together.

Further, a friction pad is further provided between the shower head holder and the connecting and fixing piece, and a spacer is further provided between a front end of the lock hole and a head of the screw.

Further, the connecting and fixing piece is integrally formed with the shower head connecting mechanism.

Further, the connecting and fixing piece is provided with a mounting hole penetrating through a left side and a right side, and the mounting hole is internally provided with at least one limiting corner which forms the wrench structure of the connecting and fixing piece.

With the above structure adopted, according to the multipurpose shower head fixing device of the invention, a structure with a wrench function is additionally provided on the connecting and fixing piece, thus, when the multipurpose shower head fixing device works with the switching valve cooperatively, no wrench is needed additionally; and the locking nut of the switching valve can be locked when the locking nut is matched with the wrench structure of the connecting and fixing piece during assembly. Since the shower head connecting structure is matched with the connecting and fixing piece, the gravity center of the switching valve does not shift after the product is mounted, and the switching valve is not prone to loosening. Compared with the existing structure, the switching valve working with the shower head fixing structure of the invention cooperatively omits the shower head holder, so that no center of gravity can shift, and no loosening of the switching valve is caused by the shift of the center of gravity during use. In addition, the nut can be assembled and disassembled through the structure thereof, no movable wrench is needed additionally, and the assembly is not restricted by the size of the space, so that the assembly and disassembly are more convenient and quicker.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to further explain the technical solution of the present invention, the present invention will be described in detail with specific embodiments.

Figure 1:
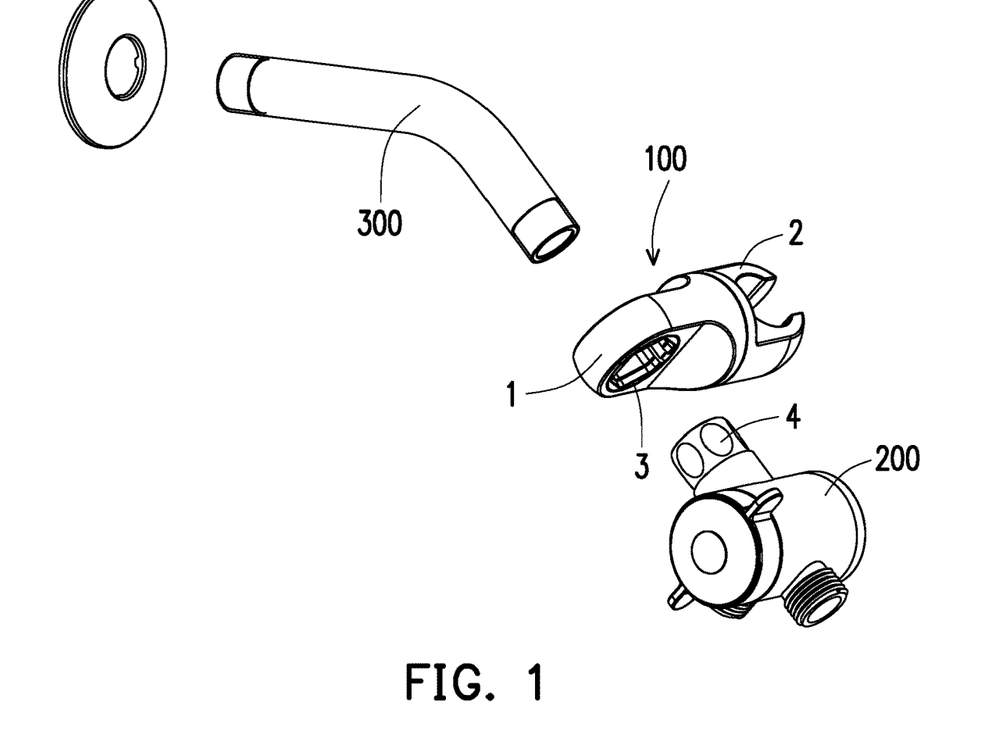
FIG. 1 is an exploded view of a shower fixing device according to a first preferred embodiment of the present invention.

A first preferred embodiment of the present invention is as shown in FIGS. 1 to 8. As shown in FIG. 1, provided is a multipurpose shower fixing device, including a switching valve 200 and a shower head fixing device 100, wherein the shower head fixing device 100 includes a connecting and fixing piece 1 having a wrench structure and a shower head connecting mechanism 2 detachably matched with the shower head, the shower head connecting mechanism 2 is fixedly connected with the connecting and fixing piece 1, and the connecting and fixing piece 1 of the shower head fixing device 100 is detachably matched with a locking nut 4 of the switching valve 200. The switching valve 200 can be of a two-way structure, a three-way structure, a four-way structure and the like, the shower head connecting structure 2 in the embodiment is a shower head holder 2 into which a shower head may be inserted, and there are other manners such as suspension, suction and the like, in which the shower head connecting structure 2 can be matched with the shower head. The connecting and fixing piece 1 is detachably and fixedly matched with the shower head holder 2.

Figure 2:
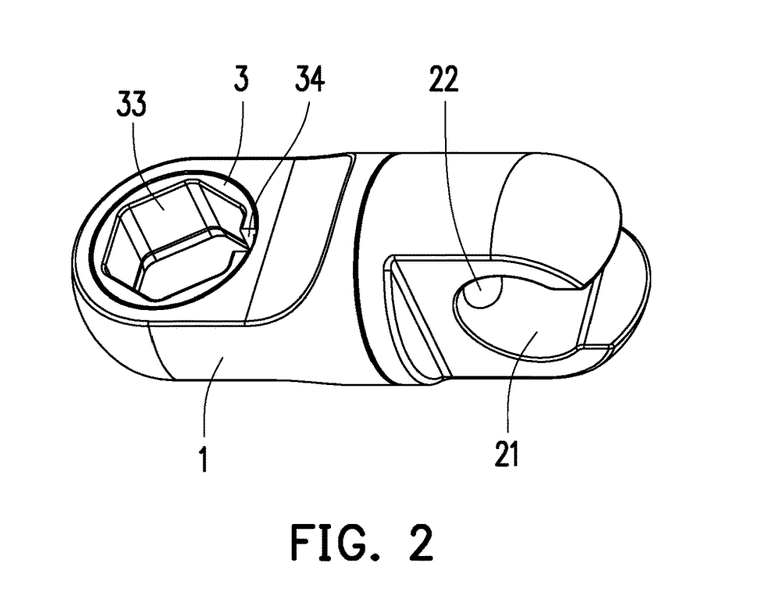
FIG. 2 is an exploded perspective view of a shower head fixing device according to the first preferred embodiment of the present invention.
Figure 3:
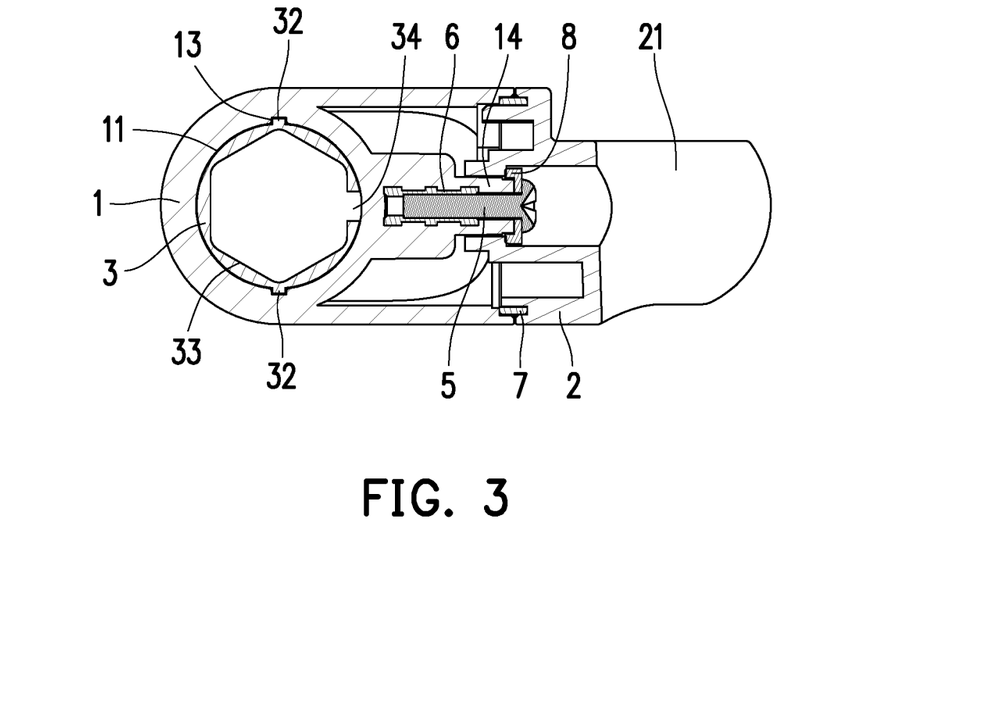
FIG. 3 is a perspective combination view of the shower head fixing device according to the first preferred embodiment of the present invention.
Figure 4:
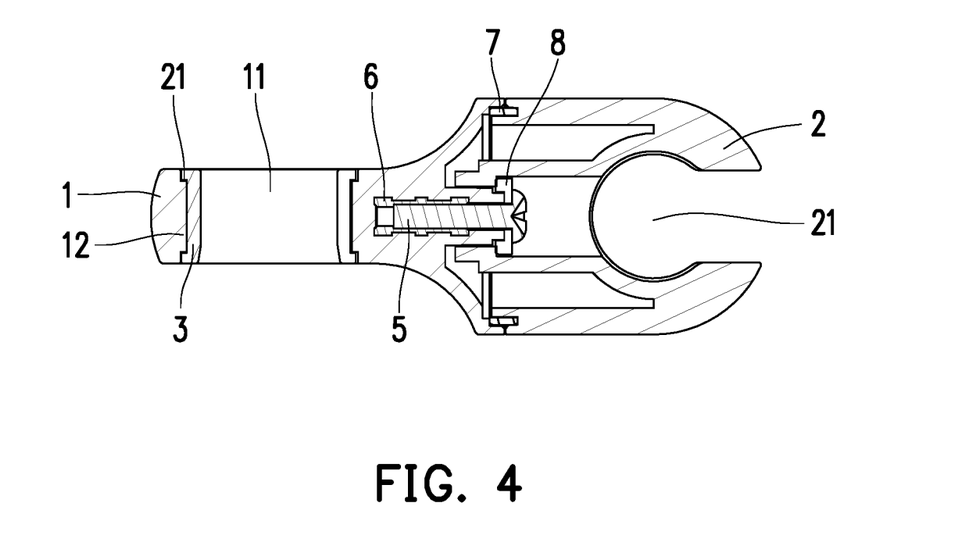
FIG. 4 is a cross-sectional view of the shower head fixing device according to the first preferred embodiment of the present invention.

The connecting and fixing piece 1 is provided with a mounting hole 11 penetrating through a left side and a right side, a flange 12 is formed on an inner peripheral wall of the mounting hole 11 in which a bushing 3 is matched, and a clamping flange 31 matched with the flange 12 is provided on an outer peripheral wall of the bushing 3, so that the outer peripheral wall of the bushing 3 is matched with the inner peripheral wall of the mounting hole 11. In order to prevent the bushing 3 from freely rotating in the mounting hole 11 after the bushing 3 is mounted, the bushing 3 and the mounting hole 11 are also provided with mutually matched convex strips 32 and grooves 13 correspondingly matched with the convex strips 32, at least one limiting corner 33 is provided at an inner peripheral wall of the bushing 3 and is used for being matched with one of the corners at the periphery of the nut, and a hexagonal structure is formed at the inner peripheral wall of the bushing 3 in this embodiment, so that six limiting corners 33 of the bushing 3 correspond to the hexagonal nut. The bushing 3 is provided with at least one opening 34 to ease the assembly of the bushing 3.

A C-shaped slot 21 is formed in a front end of the shower head holder 2, and the shower head holder 2 and the connecting and fixing piece 1 are locked together through screws 5. The shower head holder 2 is provided with a lock hole 22 penetrating front and back, a lock column 14 is provided at the front end of the connecting and fixing piece 1, a screw insert 6 is fixed in the lock column 14, and one end of a screw 5 is inserted into the screw insert 6 from the lock hole 22 of the shower head holder 2 to connect the shower head holder 2 and the connecting and fixing piece 1 together. In order to better match the shower head holder 2 with the connecting and fixing piece 1, a rubber friction pad 7 is further provided between the shower head holder 2 and the connecting and fixing piece 1, and a spacer 8 is further provided between a front end of the lock hole 22 and a head of the screw 4.

Figure 5:
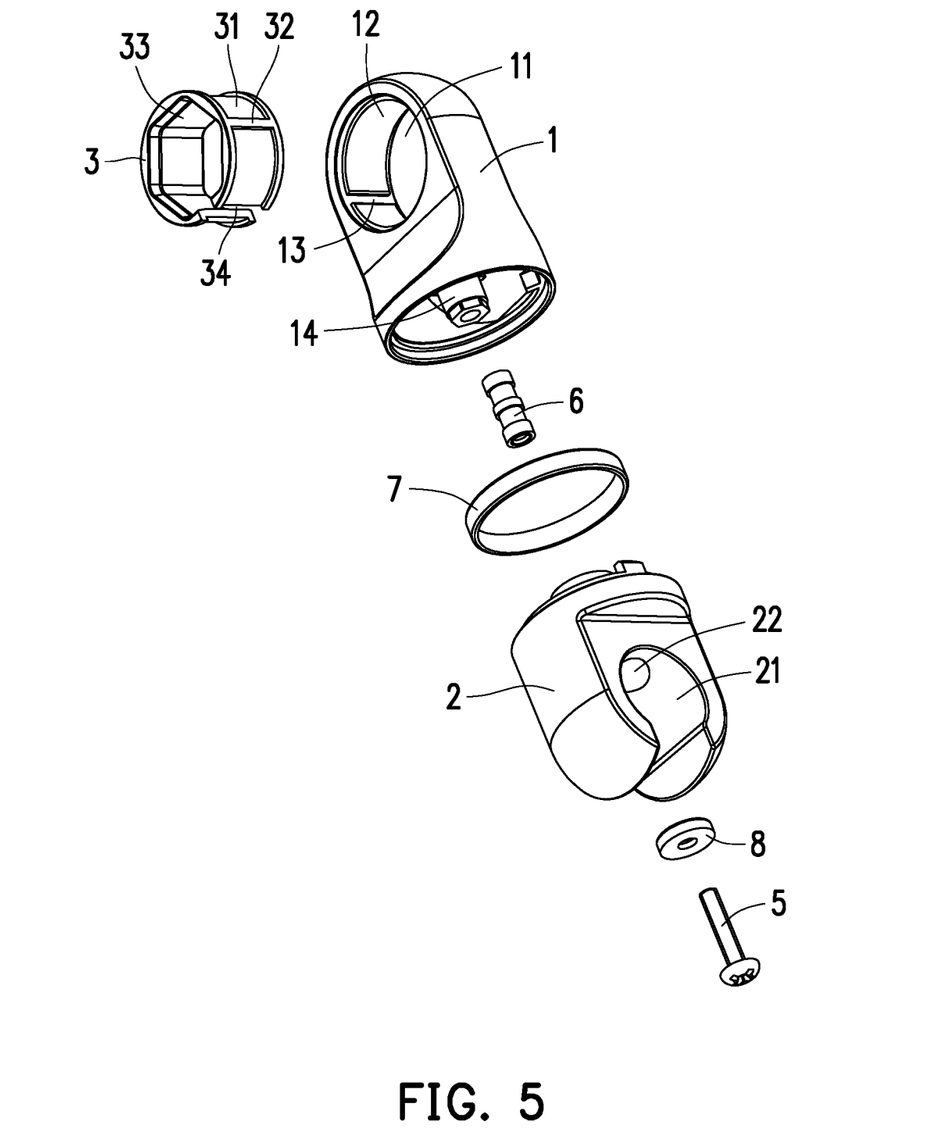
FIG. 5 is a cross-sectional view in another direction of the shower head fixing device according to the first preferred embodiment of the present invention.
Figure 6:
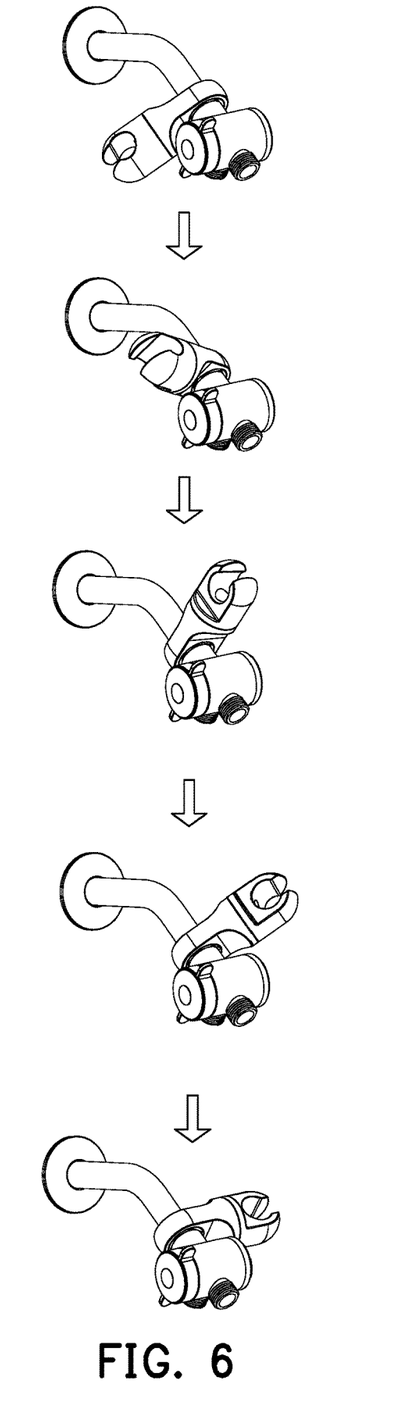
FIG. 6 is a schematic view showing an assembly operation of the first preferred embodiment of the present invention.
Figure 7:
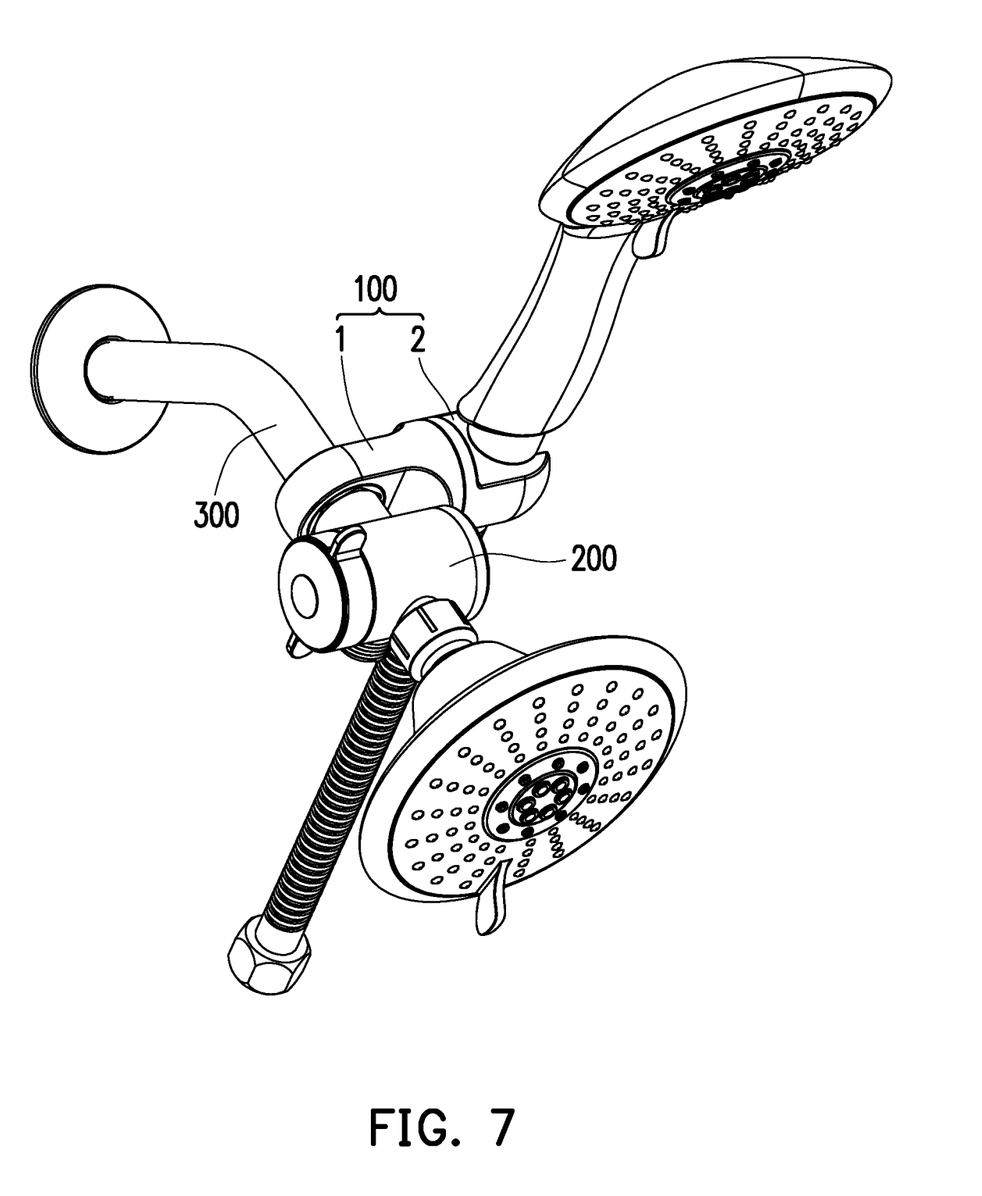
FIG. 7 is a schematic view showing a use state of the first preferred embodiment of the present invention.
Figure 8:
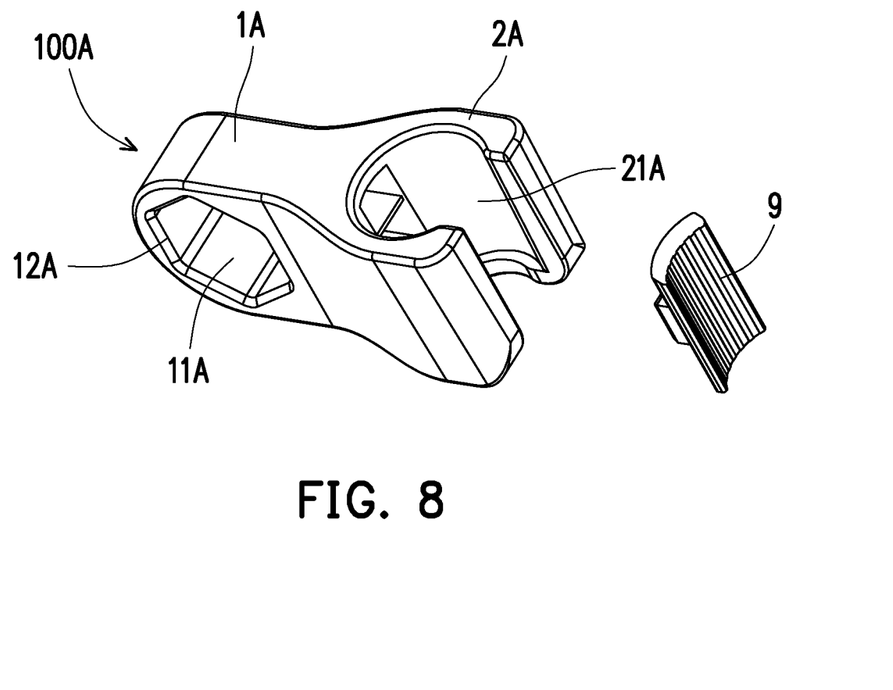
FIG. 8 is an exploded view showing the assembly of a shower fixing device according to a second preferred embodiment of the present invention.
Figure 9:
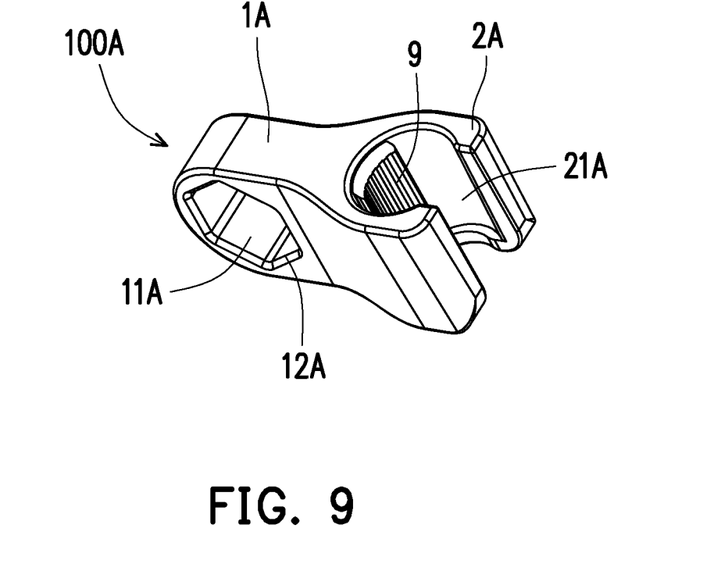
FIG. 9 is an exploded perspective view of a shower head fixing device according to the second preferred embodiment of the present invention.

Referring to FIGS. 5 to 7, during assembly, the mounting hole 11 of the connecting and fixing piece 1 of the multipurpose shower head fixing device 100 is sleeved with a water inlet elbow 300, the switching valve 200 is mounted on the water inlet elbow 300 via the locking nut 4, the limiting corners 33 of the mounting hole 11 of the connecting and fixing piece 1 are matched with the locking nut 4, the connecting and fixing piece 1 is directly used as a wrench to screw the nut 4, and after the locking nut 4 is screwed, the connecting and fixing piece 1 can be detached from the locking nut 4 in a direction of the water inlet elbow 300, and is sleeved in the locking nut after a direction of the slot 21 of the shower head holder 2 is adjusted, thereby completing the assembly. During disassembly, the switching valve 200, the multipurpose shower head fixing device 100 of the invention and the water inlet elbow 300 can be disassembled and separated by reversely unscrewing the locking nut.

As shown in FIGS. 8 to 11, provided is a second preferred embodiment of a multipurpose shower head fixing device 100A according to the present invention, including a connecting and fixing piece 1A and a shower head holder 2A having a C-shaped slot 21A, wherein the shower head holder 2A is integrally formed with the connecting and fixing piece 1A, the connecting and fixing piece 1A is provided with a mounting hole 11A penetrating through a left side and a right side, the mounting hole 11A is internally provided with at least one limiting corner 12A, a hexagonal structure is formed at an inner periphery of the mounting hole 11A in this embodiment, and six limiting corners 12A are matched with the periphery of the hexagonal locking nut 4. The C-shaped slot 21A is provided therein with a rubber pad 9.

Figure 10:
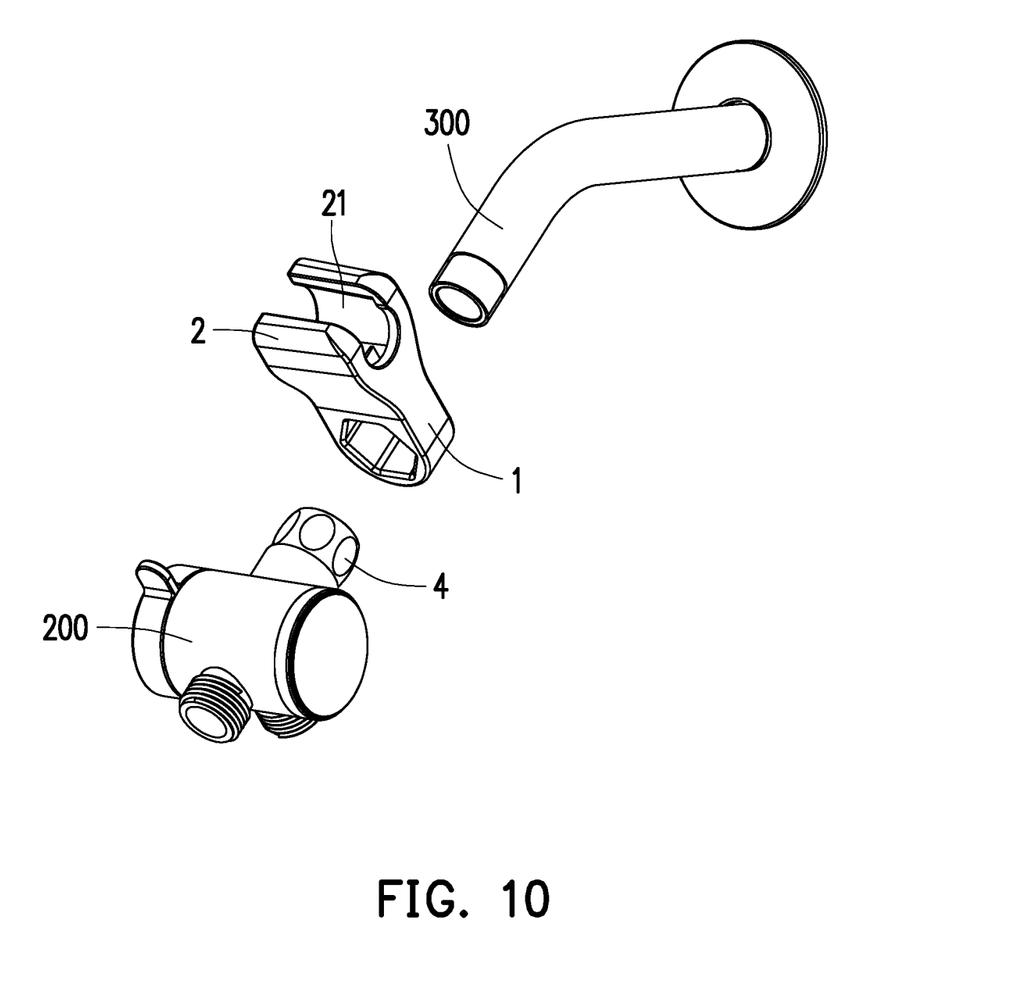
FIG. 10 is a perspective combination view of the shower head fixing device according to the second preferred embodiment of the present invention.
Figure 11:
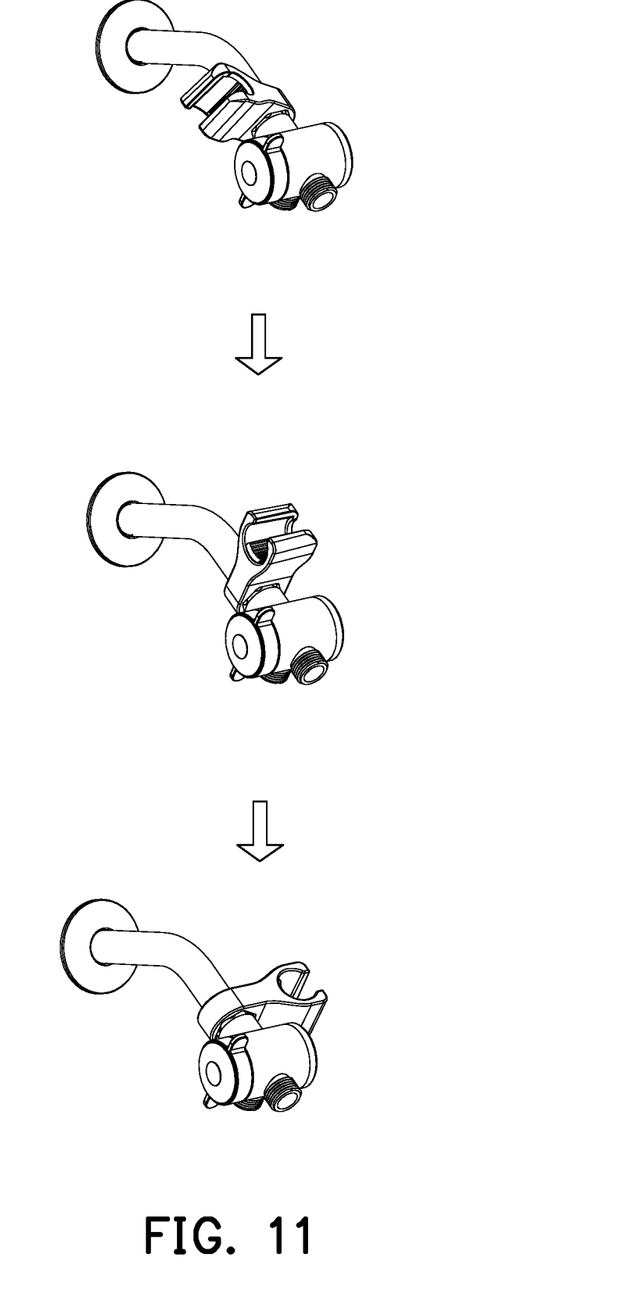
FIG. 11 is a schematic view showing mounting operation of the second preferred embodiment of the present invention.

Referring to FIGS. 10 and 11, during assembly, the mounting hole 11A of the connecting and fixing piece 1A of the multipurpose shower head fixing device of the present invention is mounted on the locking nut 4 at one end of the switching valve 200 matched with the water inlet elbow 300, the limiting corners 33 in the mounting hole 11A are matched with the locking nut 4, and the locking nut 4 is directly screwed by the shower head fixing device of the present invention. The connecting and fixing piece 1 can be detached from the locking nut 4 in the direction of the water inlet elbow 300, and is sleeved in the locking nut after the direction of the slot 21 of the shower head holder 2 is adjusted, thereby completing the assembly. During disassembly, the switching valve 200, the multipurpose shower head fixing device 100 and the water inlet elbow 300 can be disassembled and separated by reversely unscrewing the locking nut.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multipurpose shower fixing device, comprising a switching valve and a shower head fixing device, wherein the shower head fixing device comprises a connector having a wrench part and a shower head connecting mechanism detachably coupled to a shower head, the showerhead connecting mechanism is fixedly connected with the connector, and the connector of the shower head fixing device is detachably coupled to a locking nut of the switching valve,
   wherein the shower head connecting mechanism is a shower head holder, and a slot into which the shower head is inserted is formed in one end of the shower head holder.

2. A multipurpose shower head fixing device, comprising a connector having a wrench part and a shower head connecting mechanism, wherein the shower head connecting mechanism is detachably coupled to a shower head, and the shower head connecting mechanism is fixedly connected to the connector,
   wherein the shower head connecting mechanism is a shower head holder, and a slot into which the shower head is inserted is formed in one end of the shower head holder.

3. The multipurpose shower head fixing device as claimed in claim 2, wherein the connector is detachably coupled to a switching valve.

4. The multipurpose shower head fixing device as claimed in claim 2, wherein the connector has a mounting hole penetrating through a left side and a right side, and at least one limiting corner is arranged in the mounting hole and forms the wrench part of the connector.

5. The multipurpose shower head fixing device as claimed in claim 4, wherein an inner peripheral wall of the mounting hole forms an inner polygon structure, and each side of an inner polygon is one limiting corner.

6. The multipurpose shower head fixing device as claimed in claim 2, wherein the connector is fixedly and detachably coupled to the shower head holder.

7. The multipurpose shower head fixing device as claimed in claim 6, wherein a bushing is fixedly matched in a mounting hole of the connector, and limiting corners are formed on an inner peripheral wall of the bushing.

8. The multipurpose shower head fixing device as claimed in claim 7, wherein a flange is formed on an inner peripheral wall of the connector, a clamping flange matched with the flange is formed on an outer peripheral wall of the bushing, and the bushing and the mounting hole respectively have convex strips and recesses which are matched mutually.

9. The multipurpose shower head fixing device as claimed in claim 7, wherein the bushing has at least one opening.

10. The multipurpose shower head fixing device as claimed in claim 6, wherein the shower head holder has a lock hole penetrating through front and back, a lock column is disposed at a front end of the connector, a screw insert is fixedly disposed in the lock column, and one end of a screw is inserted into the screw insert from the lock hole of a shower head holder to fixedly connect the shower head holder and the connector together.

11. The multipurpose shower head fixing device as claimed in claim 6, wherein a friction pad is disposed between the shower head holder and the connector, and a spacer is disposed between a front end of a lock hole and a head of a screw.

12. The multipurpose shower head fixing device as claimed in claim 2, wherein the connector is integrally formed with the shower head holder.

13. The multipurpose shower head fixing device as claimed in claim 12, wherein the connector has a mounting hole penetrating through a left side and a right side, and at least one limiting corner is arranged in the mounting hole and forms the wrench part of the connector.

* * * * *